United States Patent [19]
Robertson

[11] Patent Number: 5,879,567
[45] Date of Patent: *Mar. 9, 1999

[54] METHOD OF PURIFYING AQUARIUM WATER USING A PRESSURIZED, TANK MOUNTED, FLUIDIZED BED FILTER

[75] Inventor: Mark B. Robertson, Gainesville, Fla.

[73] Assignee: Bio-Con Labs, Inc., Gainesville, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 783,528

[22] Filed: Jan. 14, 1997

Related U.S. Application Data

[63] Continuation of Ser. No. 320,464, Oct. 7, 1994, abandoned.

[51] Int. Cl.$^6$ .............................. B01D 24/36; A01K 63/04
[52] U.S. Cl. ......................... 210/786; 210/616; 210/169; 210/416.2; 119/260
[58] Field of Search .................................. 210/150, 151, 210/169, 252, 287, 295, 297, 354, 786, 616, 416.2; 119/259, 260

[56] References Cited

U.S. PATENT DOCUMENTS

| | | | |
|---|---|---|---|
| 1,784,132 | 12/1930 | Cabrera . | |
| 2,546,650 | 3/1951 | Nijboer | 210/786 |
| 3,767,048 | 10/1973 | Prenzemann | 210/786 |
| 4,126,546 | 11/1978 | Hjelmner et al. | 210/786 |
| 4,411,780 | 10/1983 | Suzuki et al. . | |
| 4,834,872 | 5/1989 | Overath . | |
| 4,954,257 | 9/1990 | Vogelpohl et al. . | |
| 5,055,186 | 10/1991 | Van Toever | 210/150 |
| 5,232,586 | 8/1993 | Malone | 210/151 |
| 5,250,187 | 10/1993 | Franks . | |
| 5,314,521 | 5/1994 | Rogalla et al. . | |
| 5,353,745 | 10/1994 | Fahs, II | 119/226 |
| 5,447,629 | 9/1995 | Chaumont et al. . | |
| 5,453,183 | 9/1995 | Hoffa | 210/169 |
| 5,466,373 | 11/1995 | Handwerker et al. | 210/150 |
| 5,527,455 | 6/1996 | Hoffa | 210/169 |
| 5,705,057 | 1/1998 | Hoffa | 210/169 |
| 5,792,368 | 8/1998 | Robertson | 210/169 |

FOREIGN PATENT DOCUMENTS

| | | | |
|---|---|---|---|
| 4032265 | 4/1992 | Germany . | |
| 291695 | 11/1988 | Japan | 210/786 |
| 2111497 | 4/1990 | Japan . | |

OTHER PUBLICATIONS

Bullock, G. et al. (1993) "Qualitative and Quantitative Bacteriological Studies on a Fluidized San Biofilter Used in a Semiclosed Trout Culture System" Biological Report 17, Jul.

Malone, R.F., D.G. Burden (1988) "4.4 Fluidized Bed Filters" Design of Recirculating Soft Crawfish Shedding Systems Lousiana Sea Grant College, Baton Rouge, LA, pp. 41–45.

Primary Examiner—Robert Popovics
Attorney, Agent, or Firm—Saliwanchik, Lloyd & Saliwanchik

[57] ABSTRACT

A fluidized bed filter is described and claimed. The filter is exemplified for use in an aquaculture system under hydraulic pressure. A preferred embodiment of the filter of the subject invention comprises a closed cylinder having an inlet port and an outlet port at or near one end. Water is pumped into the inlet port and through a hollow delivery tube positioned within the cylinder and ending a short distance from the closed end of the cylinder. The force of the water contacting the closed end of the cylinder causes the water to change direction drastically creating a flow pattern within the cylinder. This flow pattern exerts a force sufficient to fluidize filter medium within the cylinder. Filtered water escapes the system via the outlet port.

6 Claims, 2 Drawing Sheets

METHOD OF PURIFYING AQUARIUM WATER USING A PRESSURIZED, TANK MOUNTED, FLUIDIZED BED FILTER

This application is a continuation, of application Ser. No. 08/320,464, filed Oct. 7, 1994, now abandoned.

BACKGROUND OF THE INVENTION

Fluidized bed filters are used widely in aquaculture, water purification, and wastewater treatment. These filters can also be used in bioremediation. Under pneumatic pressure, fluidized bed filters are used to filter and treat gases, to size and separate particles, to mix powdered components, and to coat particulate substrate. The fluidized bed filters used in aquaculture are specialized biological filters which are used to remove waste products from the recirculating culture system.

Aquaculture is a term used generally to describe a variety of methods and systems for producing plants and animals in water environments. Thus, aquaculture can involve not only the cultivation of fish but also includes the cultivation of many aquatic plants and a variety of aquatic animals in addition to fish. Alligators, crawfish, frogs and seaweed are routinely cultivated by aquaculture. As the demand for healthful and exotic foods rises, aquaculture continues to expand. New species are being cultivated and advances are being made toward the increase in production of aquaculture systems. Additionally, the popularity of fresh and saltwater aquariums has enjoyed a resurgence further adding to the demand for better aquaculture systems. As used herein, the term "aquaculture" refers not only to systems for the commercial production of plants and animals, but also to consumer systems such as fresh and saltwater aquariums.

Providing for artificial cultivation of fish and other animals in populations far more dense than in nature, is a difficult prospect. Adequate food and oxygen must be supplied to the population. Further, waste must be continuously removed from the water. To maintain a supply of food and oxygen to the plant or animal population, water can be continuously pumped from a suitable source through an aquaculture system, then discharged. This, however, requires great quantities of water to maintain the system. Unfortunately, water is often a limiting factor in aquaculture. Also, the wastewater must be treated and disposed of properly. Therefore, semi-closed aquaculture systems have been developed in which water is recirculated within the system (Bullock et al, 1993). Only small amounts of new water are added periodically in a semi-closed system. Oxygen and nutrients are added to the recirculating water and waste is removed through appropriate filtration and treatment systems.

Waste can be removed from a semi-closed system by utilizing any or all of three types of "filtering" means: mechanical, chemical, and biological. Each type of filter has certain advantages with regard to the type of waste it removes most efficiently. Therefore, the filter types are often used in succession to effectively clean the recirculated water.

Particulate matter can be removed by a mechanical type filter which physically removes solid waste from the water. Mechanical filtration is often the initial step in a filtration process because particulate waste eventually breaks down and can interfere with the operation of other filters. Chemical filters typically absorb or adsorb dissolved organic compounds from the water and most often comprise an inert adsorbent such as activated charcoal.

Biological filters can remove ammonia and other metabolites from the water. Ammonia waste is of particular concern in fish aquaculture because ammonia is generated by the fish population but is toxic to the fish. Therefore, ammonia must be effectively removed from the system. In nature, ammonia waste is normally removed from water through natural processes by "ammonia-eating" bacteria. These bacteria convert ammonia to other nitrogen-containing compounds through their normal metabolic activity. Also, because of the large volume of water in nature, the concentration of ammonia is generally quite low. Fish populations in aquaculture systems are far more dense than in nature; therefore, ammonia cannot generally be adequately removed from these systems by the bacteria which naturally exist in the water. Biological filters are often used, therefore, to assist in the ammonia removal process. Biological filters can comprise bacteria which convert ammonia to other compounds. These bacteria colonize the filter media and use, as a food source, nutrients in the water. Ammonia is a primary food source for the colonizing bacteria and, by the bacterial action, ammonia waste is removed from the water.

A primary function of the biological filters is to concentrate the ammonia-degrading bacteria and to allow them to proliferate. Typically, ammonia is first metabolized to nitrite by *Nitrosomas sp.* bacteria. Nitrites are also toxic to aquatic life; however, different bacteria convert these nitrites to nitrates. For example, nitrites are converted to nitrates by *Nitrobacter sp.* bacteria. The nitrates are then converted to harmless, inert nitrogen gas by plants or anaerobic bacteria. Each of the bacterial species necessary to remove the ammonia from the system is present naturally in the water. The concentrated, enriched population of bacteria in a biological filter can efficiently and effectively remove ammonia generated by even dense populations of fish.

Currently, biological filters used in aquaculture include fluidized sand filters (Malone and Burden, 1988). A fluidized sand filter typically comprises an open chamber approximately half-filled with sand. An inlet port is positioned in the center of the bottom of the chamber. The sand within the chamber is colonized by bacteria. Waste water is pumped into the system through the inlet port. The force generated by the flow of the water expands, or "fluidizes," the sand within the water-filled chamber. Water contacting the sand colonized by the bacteria is cleansed of ammonia by the action of the bacteria. Treated water leaves the system through an outlet port near the top of the open chamber.

Some of the advantages of using a fluidized bed for biological filtration are as follows:

1. There is no mechanical particle capture ability in these filters, which means that they do not clog during use. This is a rather significant problem with other filtration systems. Since the media bed is fluidized and constantly moving, any particles that enter the filter ultimately pass through without becoming lodged.

2. Since a biological filter depends upon bacteria to function, it is very important to have as much surface area available for growth as possible. Fluidized bed filters have very large amounts of surface area, due to the fact that they use a fine grade of media which has high surface area for its volume.

3. What makes a fluidized bed filter especially unique is the fact that it can fully utilize all of the available media surface area, since the media bed is in constant motion. This allows the incoming water to be thoroughly mixed with the bacteria on the medium, instead of passing around it as in a fixed media filter. This method of ammonia removal is highly efficient.

Despite the advantages of fluidized bed filters for aquaculture, there are still significant drawbacks to their use.

For example, should flow of the water cease, the filter medium, by the force of gravity, settles to the bottom of the chamber. Existing filters utilize a variety of designs to try to prevent the media from settling into the entry tube. In one design, a perforate disk overlays the inlet port of the fluidized sand filter, pea gravel is layered on top of the disk. The pea gravel layer and perforated disk help to prevent the filter medium from settling into the inlet port. However, settled filter medium can still pack the port and the bottom of the chamber and can obstruct the flow of water. Obstructions are difficult to clear and often require significant water pressure to blast settled filter medium free and refluidize a system. It is often necessary to completely replace choked filters. It is therefore essential that these fluidized sand filters are monitored continuously to prevent shut down.

The drawbacks of the sand biofilters are common to all fluidized bed filters; therefore, a simple, efficient fluidized filter which requires little maintenance and does not choke upon the loss of pressure or flow would greatly improve any fluidized filtration system.

BRIEF SUMMARY OF THE INVENTION

The subject invention pertains to an improved fluidized bed filter. The fluidized bed filters of the subject invention are particularly effective in the removal of nitrogenous wastes from aquaculture systems. The fluidized bed filters of the subject invention can be constructed in a wide range of sizes for use in a variety of systems, i.e., filters for use in aquaculture systems can be constructed in a size to fit a home aquarium or a large commercial system.

In a preferred embodiment, the fluidized bed filter of the subject invention comprises a closed main cylinder which is mounted vertically and which has an inlet port and an outlet port at or near the top end of the closed main cylinder. A hollow delivery tube is attached to the inlet port. The hollow delivery tube is disposed within the closed cylinder and runs along the longitudinal axis of the cylinder terminating just short of the closed end. Preferably, the main cylinder is filled about half full with a medium. Typically, the medium can be colonized by bacteria which metabolize nitrogenous wastes. This medium can be, for example, sand.

When the filter of the subject invention is in use in an aquaculture system, water is pumped through the inlet port and hollow delivery tube and into the main cylinder. The open end of the hollow delivery tube is inverted and directed at the closed end of the cylinder. The force of the water contacting the closed end of the cylinder as it exits the hollow delivery tube causes the water to change direction, creating an upward flow pattern within the cylinder. This flow pattern exerts a force sufficient to fluidize the filter medium within the cylinder. Treated water leaves the filter via an outlet port at or near the top of the main cylinder.

The filter of the subject invention is particularly advantageous because the introduction of water into the system through the hollow delivery tube prevents filter media from obstructing the inlet port should the flow of water cease.

In one embodiment of the subject invention, the hollow delivery tube also features small holes in the side of it, which facilitates the "breaking up" of a compacted filter bed. As described more fully herein, when the filter is shut down for service, the media bed can compact into the cylinder's bottom. When the flow resumes, a portion of the flow exits the small holes in the hollow delivery tube, under pressure, and creates a weak spot in the media bed. This allows the media bed to break up and fluidize much more easily.

Another embodiment of the invention includes a kit wherein the filter is packaged for use by an owner of a home aquarium. A pump, such as a seven watt pump, can be packaged with the filter; the pump supplies the aquarium water to the filter when it is in use. Advantageously, the filter can be fitted with especially designed brackets to allow the filter to be hung from the aquarium tank.

Surprisingly, the subject filter requires a lower flow rate than currently is needed to fluidize the filter material for available fluidized sand filters for aquaculture systems. Further, it has been discovered that the filters of the subject invention are significantly quieter than other designs.

DETAILED DESCRIPTION OF THE INVENTION

The subject invention pertains to an improved fluidized bed filter. In a preferred embodiment, the fluidized bed filter is designed to operate as a biological filter for the removal of ammonia and other nitrogenous wastes from a water supply. This is accomplished, for example, by the colonization of naturally occurring bacteria on the surface of the filter's medium. As water flows past the medium, the bacteria first convert ammonia into nitrite, which is then converted into nitrate by other bacteria present in the medium. The filter of the subject invention resists choking and requires a lower flow rate to maintain the bed in a fluidized state than currently used aquaculture filters. The filter is exemplified for use under hydraulic pressure. This design is a sealed cylinder, which prevents leakage and balances flow rates when compared to other designs for aquaculture, which are open top tanks.

In a preferred embodiment, the filter of the subject invention is mounted vertically, with clamps. In this position, the outlet port is at or near the top of the cylinder. Water enters the system of the subject invention from an inlet port and through a hollow delivery tube. In a preferred embodiment, the inlet port will also be near the top of the cylinder. The hollow tube is inverted in respect to the bottom of the cylinder. Treated water exits the system through an outlet port at or near the top of the cylinder.

The introduction of water into the system through the hollow delivery tube creates a unique flow pattern within the cylinder. Because the outlet of the hollow tube is positioned only a short distance from the end cap of the cylinder and is inverted in respect thereto, water forced through the tube is deflected off the bottom of the cylinder causing a reverse flow. This reverse flow effectively fluidizes the filter medium. The unique flow pattern also forces water across the end of the cylinder and prevents settling of filter material into joints and corners.

Advantageously, filter medium cannot settle into the hollow delivery tube as it can the bottom inlet of the currently used fluidized sand filters. The delivery tube is inverted in respect to the bottom of the cylinder, which prevents settling media from entering the tube. A check valve can be installed on the inlet port to further prevent the fouling of the delivery tube by a siphoning effect. The filter of the subject invention therefore will not become obstructed and choke when flow to the system is temporarily terminated.

Figure 1:
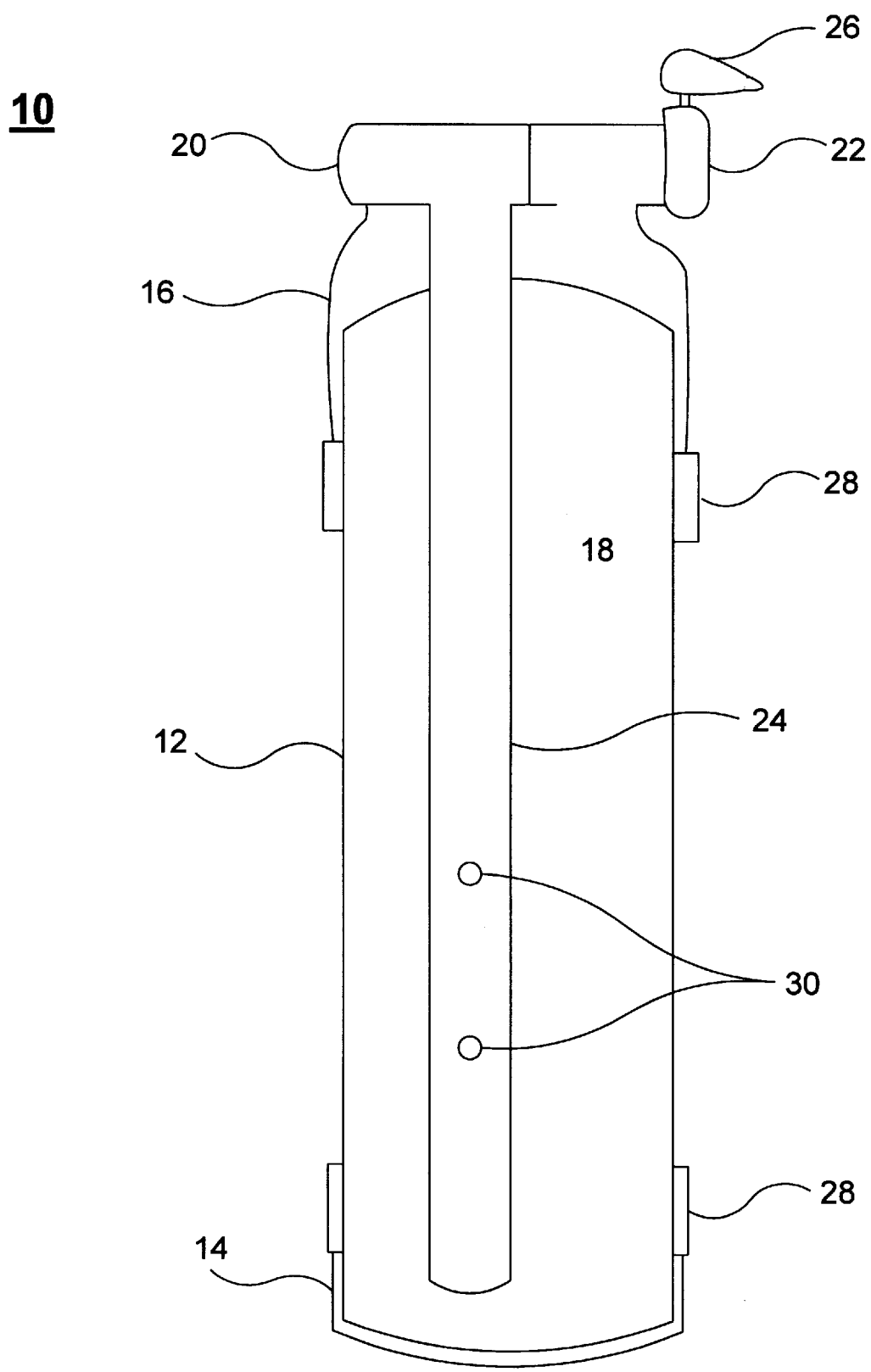
FIG. 1 is an elevational view of a preferred embodiment of the filter of the subject invention.

In a preferred embodiment of the subject invention, a pressurized, fluidized bed filter is shown generally at 10, FIG. 1. The filter comprises a main cylinder 12 closed at one end by an end cap 14 and at the other end by a tank head 16 to form an inner closed chamber 18. The tank head 16 has an inlet port 20 and an outlet port 22. The inlet port 20 is attached to a hollow delivery tube 24 which is open at the opposite end and is disposed within the closed chamber 18 running along the longitudinal axis of the cylinder. The hollow delivery tube 24 terminates just above the end cap 14. A fine particulate filter medium is placed within the closed chamber 18.

Figure 2:
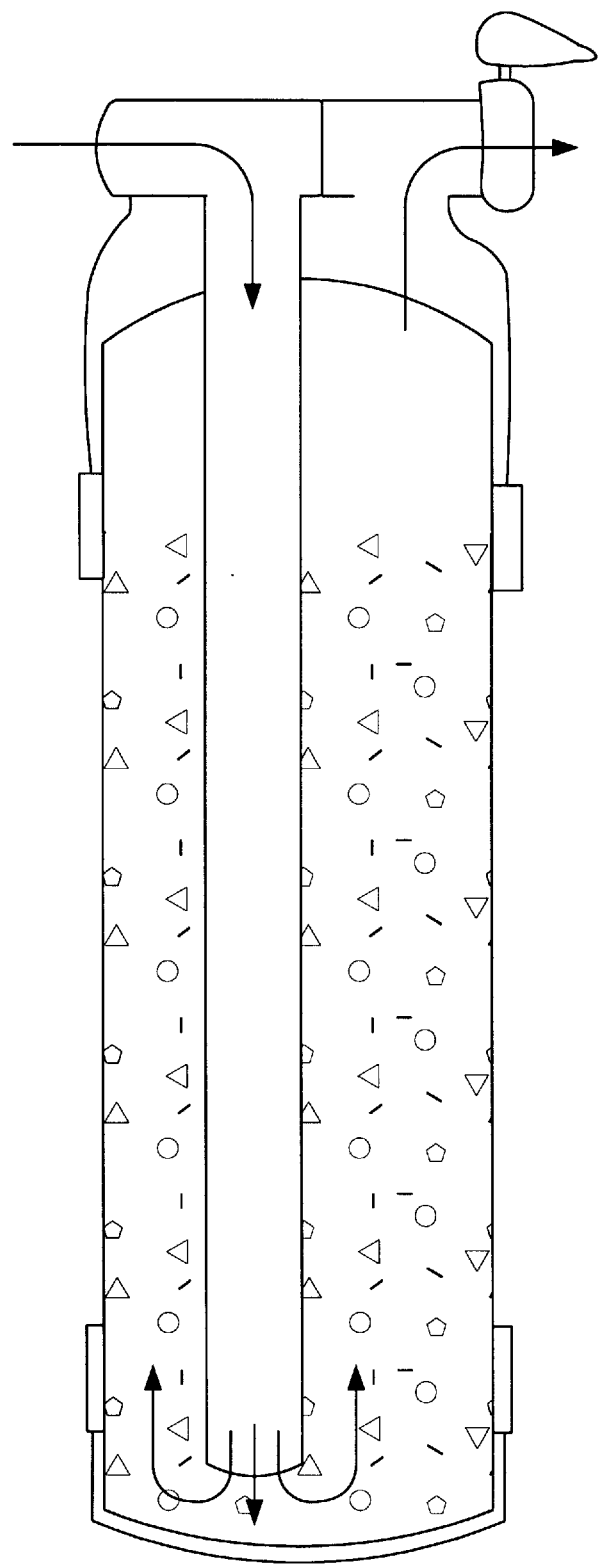
FIG. 2 is an elevational view of the filter of the subject invention showing the flow pattern created therein.

The filter of the subject invention is shown in operation in FIG. 2. In a preferred embodiment, water to be treated is pumped into the inlet port 20 and through the hollow delivery tube 24. As the water exits the hollow delivery tube it is deflected off the end cap 14 which changes the direction of flow and creates a flow pattern. When the flow rate of the water being pumped into the tube and deflected off the end cap exerts sufficient force to overcome the inertia of the filter medium, the filter bed will expand, or "fluidize."

Flow rate within the system is regulated so as to provide adequate fluidization of the filter medium but to prevent flushing of the medium through the outlet port and from the system. Flow rate can be controlled using a flow valve 26 at the outlet port 22. The filter of the subject invention need not include a flow valve to control flow rate. Flow rate can be controlled by the rate at which material is pumped into the system.

The fluidized bed filter of the subject invention is highly advantageous because the flow is introduced into the cylinder in such a fashion that the filter does not clog or choke during periods of low or no flow rate. Existing filters will clog the inlet port when flow is interrupted, and they must rely on a complex series of valves and grids to guard against this. The method of introducing the flow via a delivery tube greatly simplifies construction, mounting, and operation of the filter. The filters of the subject invention are particularly advantageous because the manner in which materials are introduced into the filter medium reduces the flow requirements needed for proper fluidization of the medium, when compared to other filters of this type. This allows for greater contact time between the materials to be filtered and the medium and more efficient removal of waste.

The main cylinder 12 of the subject invention can be of any appropriate size to facilitate adequate treatment. Thus, the size would typically depend on the flow rate needed to operate the system. The filters of the subject invention can be built to accommodate virtually any flow rate. In aquaculture systems, for example, smaller filters may be used which have a flow rate of 1 gallons per minute or less. Larger filters for commercial operations can treat 500 gallons per minute or more.

Typically, the main cylinder will be between about 6 inches and about 8 feet in length and between about 1 inch and about 4 feet in diameter. The diameter of the hollow delivery tube must be adequate to deliver the necessary flow rate to the filter. Typically, the diameter of the hollow delivery tube will be between about ⅛ inch and about 1 foot. The cross-sectional area of the hollow delivery tube will be from about one-sixth to about one-fourth of the cross-sectional area of the main cylinder. The hollow delivery tube will typically end between about ½ inch and about 4 inches from the bottom of the main cylinder. The bottom of the main cylinder can be flat, concave, convex, or any other appropriate shape. As the flowing material exiting the hollow delivery tube strikes the bottom of the main cylinder, it will be deflected upward and fluidize the bed. In a preferred embodiment, the shape of the bottom of the main cylinder is concave to help to direct the flow upward, thereby facilitating the fluidization process.

The media used in the filters of the subject invention can be a fine particulate, usually silica or sand. The filter media must be hard enough to resist pulverization by the action of the system. The media must also have a density that permits complete fluidization at a flow rate compatible with the system. The optimal flow rate for an aquaculture biofilter is determined by the rate at which the bacteria that colonize the filter media can process ammonia waste in the water. Water at a higher flow rate is retained within the system for a shorter period of time. The "ammonia-eating" bacteria therefore are in contact with the waste for a shorter period of time. This can result in the incomplete removal of ammonia from the water. Heavy or dense particles require higher flow rates to fluidize the media and also tend to settle. Less dense particles, although requiring lower flow rates for fluidization, may be too light to hold their position within the filter and be flushed from the system. Filter media must be selected that will fluidize at a flow rate which allows adequate retention time for complete ammonia waste removal. Additionally, filter media having a round or relatively round shape provide maximum surface area on which bacteria in a biofilter can colonize. It is generally recommended in aquaculture that a surface area of about three square feet per pound of fish be provided. Maximum surface area means more bacteria per filter to process waste. In one embodiment, silica having about 36–40 square feet of surface area per pound can be used in an aquaculture biofilter at a flow rate of 1–1½ gallons per minute.

The flow rate used according to the subject invention should be sufficient to flush deposited materials from the medium. Deposits in the filter medium can cause channelling within the system. Channeling involves the buildup of material within the system which restricts the available space in which the fluidized material may circulate. As the same amount of material is forced through less space, flow within the system increases. Thus, when channeling occurs, retention time within the system is reduced. In an aquaculture biofilter, the bacteria colonizing the filter medium have less time to act upon the water. Further, filter medium that is deposited in crevices and corners no longer present all available surface area to the circulating water. Therefore, fewer bacteria are coming into contact with more water for less time. Under these circumstances, treatment of the water becomes incomplete. Bits of food and solid matter can also become trapped in channeled areas further restricting flow. The unique design of the subject invention prevents or reduces the incidence of channeling.

Terminating the flow of the water through a vertically mounted filter causes the filter medium to settle by gravity to the bottom of the cylinder. If the medium sits in the bottom of the cylinder for an extended period, it may start to pack or compress, forming a column of hardened filter medium that is resistant to refluidization. Refluidization of the hardened bed could require forces in excess of what are normally required in an active system. To assist in breaking the resistance that may result from this settled medium, release holes 30 can be bored into and positioned along the hollow delivery tube 24. Release holes will normally be positioned below the level of the fluidized bed and often below the level of the non-fluidized bed. Release holes may also be bored above the level of the fluidized bed. Water exits these release holes to break the settled bed in layers. Water exiting from the end of the hollow delivery tube disturbs the remaining material and the bed is refluidized.

Although the filter of the subject invention is specifically exemplified for use in a vertical position, the filter may be mounted at any angle in which the flow pattern created by the force of the water through the hollow delivery tube will produce sufficient force to fluidize the filter medium. The filter can be mounted using a number of means including mounting clamps 28, as exemplified, or clips, ties or specially designed stands. A filter for use with home aquariums can be mounted in a set of brackets which are attached to a hanger or hook that rests over the rim of the aquarium tank. The brackets fit snugly around the filter to hold it securely in place.

The filter of the subject invention can be constructed from a variety of materials. As exemplified, the fitter is designed for use in an aquaculture system. The parts and pieces of this filter therefore should be resistant to rust and corrosion. Further, the materials from which the filter is made must be able to be sealed so that the filter is water-tight. Plastics are resistant to rust and corrosion and can be caulked with silicon or other sealants to be water-tight. Clear plastics can be used for the main cylinder and hollow delivery tube to allow visual monitoring of the flow within the system. Other materials from which filter parts can be constructed include materials such as stainless steel or any material that has sufficient rigidity and tensile strength to hold the form of the filter and withstand the force of the flow rate.

The filter of the subject invention can be provided in a kit for home aquarium use. The kit could comprise the fluidized bed filter and a pump, such as a seven watt pump commonly used in aquarium systems. The pump provides the filter with an adequate flow rate of aquarium water to fluidize the filter bed. The kit can further comprise a mechanical, sponge-type filter to be placed in line before the fluidized filter to remove particulate waste.

The fluidized bed filter of the subject invention is exemplified for use in a closed chamber and under hydraulic pressure. The unique features of the filter include the delivery of the material to be filtered through a delivery tube. The hollow delivery tube is inverted in respect to the end of the closed cylinder. It is the positioning of this delivery tube and the force exerted by the material flowing through it that provide for the operation of the filter at a reduced flow rate and results in the resistance of the filter to choking upon a cessation of flow. It would be apparent to those skilled in the art that this delivery design can also be used in an open or semiclosed chamber under pneumatic pressure as well as hydraulic pressure and can be used to filter a variety of materials.

Following are examples which illustrate procedures, including the best mode, for practicing the invention. These examples should not be construed as limiting. All percentages are by weight and all solvent mixture proportions are by volume unless otherwise noted.

EXAMPLE 1

Construction of a Pressurized Fluidized Bed Filter

The following is a detailed description of the materials, construction, and operation of a fluidized bed filter of the subject invention.

Materials list with specifications:
Quantity
1 Tank head from Park International
1 Schedule 80 female adapter, 2½ inches, Spears Manufacturing Company
1 Schedule 80 end cap, 2½ inches, Spears Manufacturing Company
1 2½ inch clear tube, 24 inches in length, Excelon Company
1½ inch tube, 26 inches in length, Excelon Company
2 2½ inch mounting clamps, CLIC
1 Uni-Weld cement, United Elchem Ind., Inc.
1 Water flow valve, any quality unit
3 lbs. quartz silica, medium grade Construction:

1. Cement the female adapter to one end of the 2½ inch clear tube, and the end cap to the other end of the same clear tube.

2. Cement the ½ inch clear tube into the inlet port of the tank head.

3. Measure 10 inches up from the open end of the ½ inch tube, then drill a ¼ inch hole through one side of the tube, perpendicular to its length.

4. Cement the tank head into the cylinder created in Step 1.

5. Add the medium to the cylinder through the fill port provided in the tank head. The amount of medium should fill the cylinder approximately half full.

6. Attach the water flow control valve to the tank head.

7. Attach the two mounting clamps to the cylinder and mount the filter vertically.

8. Pressure test the unit, with 30 psi of air, to insure that there are no leaks in any of the mating surfaces.

EXAMPLE 2

Operation of the Fluidized Bed Filter

1. The water to be filtered is pumped into the cylinder by means of an external pump.

2. The water enters the cylinder and flows downward through the ½ inch tube.

3. The water exits this tube and deflects off the bottom of the cylinder, which is approximately ½ inch from the outlet of this tube. This forces the water to change direction from downward to upward in the larger surrounding main cylinder.

4. The water rises through the filter medium in the main cylinder and exits via the top of the cylinder.

5. By increasing the flow through the filter medium, the inertia of the water will overcome the density of the medium, causing the filter bed to expand and fluidize.

6. The percentage of medium expansion is controlled by regulating the water flow via the valve on the filter.

7. The flow rate should be kept low enough to prevent flushing the medium out of the filter.

8. The purpose of the ¼ inch hole in the ½ inch tube is to provide a means of "breaking" the filter medium apart, should the pump flow be interrupted.

It should be understood that the examples and embodiments described herein are for illustrative purposes only and that various modifications or changes in light thereof will be suggested to persons skilled in the art and are to be included within the spirit and purview of this application and the scope of the appended claims.

References

Bullock, G., J. Hankins, J. Heinen, C. Starliper, J. Teska (1993) "Qualitative and Quantitative Bacteriological Studies on a Fluidized Sand Biofilter Used in a Semiclosed Trout Culture System," *Biological Report* 17, July.

Malone, R. F., D. G. Burden (1988) *Design of Recirculating Soft Crawfish Shedding Systems*, Louisiana Sea Grant College, Baton Rouge, La.

I claim:

1. A method for filtering aquarium water wherein said method comprises introducing said water into a fluidized bed filter comprising (a) a main cylinder closed at both ends, thus forming an enclosed chamber which operates under hydraulic pressure;

(b) an inlet port;

(c) a hollow delivery tube mounted to said inlet port and extending into said chamber terminating above a first closed end wherein said hollow delivery tube has an open end directed towards said first closed end of said chamber, and wherein said hollow delivery tube terminates a short distance above said first closed end such that, when the filter is in operation, the force of said water to be filtered exiting said hollow delivery tube is sufficient to prevent filter media from accumulating between said hollow delivery tube and said first closed end;

(d) an outlet port at or near a second end; and (e) filter medium disposed within said chamber;

wherein water to be filtered enters said inlet port, passes through said hollow delivery tube, exits said open end of said delivery tube, and is deflected off said first closed end of said chamber, wherein the force exerted by said water fluidizes said filter medium and said water exits through said outlet port; and collecting said water from said outlet port of said fluidized bed filter.

2. The method, according to claim 1, wherein said filter further comprises a flow valve at said outlet port.

3. The method, according to claim 1, wherein said filter further comprises a release hole on said hollow delivery tube.

4. The method, according to claim 3, wherein said release hole is nearer said first end.

5. The method, according to claim 1, wherein said first closed end of said main cylinder is concave.

6. The method, according to claim 1, wherein said filter further comprises mounting clamps for hanging said filter.

* * * * *